April 6, 1926.

V. R. WILLOUGHBY

DISCHARGE OUTLET VALVE

Filed April 21, 1922   3 Sheets-Sheet 1

1,579,267

INVENTOR:
Victor R. Willoughby
BY T. H. Gibbs
ATTORNEY.

April 6, 1926.
V. R. WILLOUGHBY
1,579,267
DISCHARGE OUTLET VALVE
Filed April 21, 1922   3 Sheets-Sheet 2
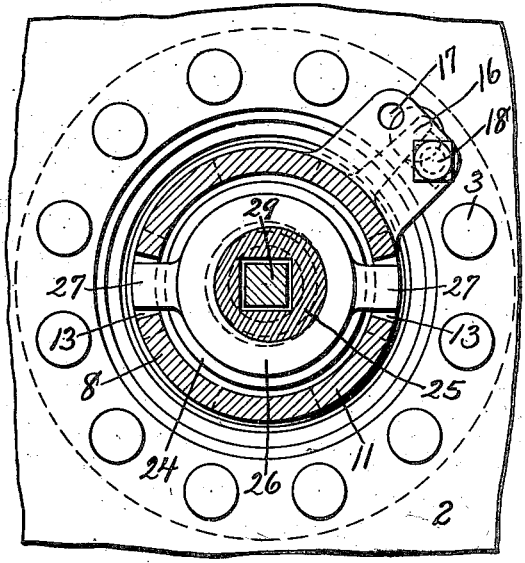
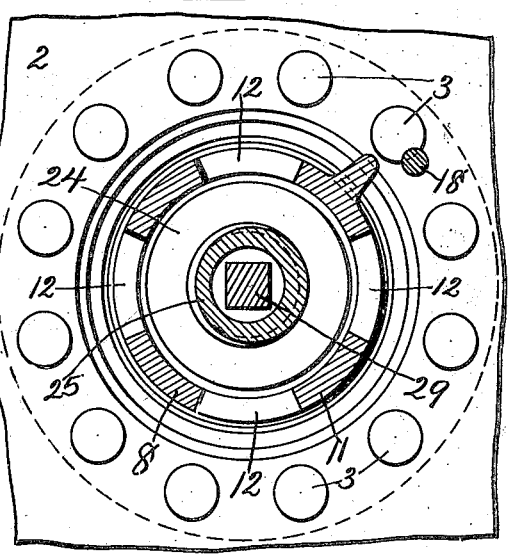
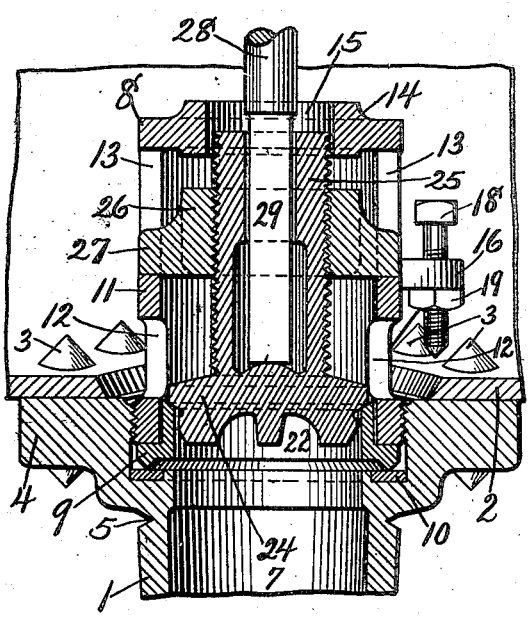
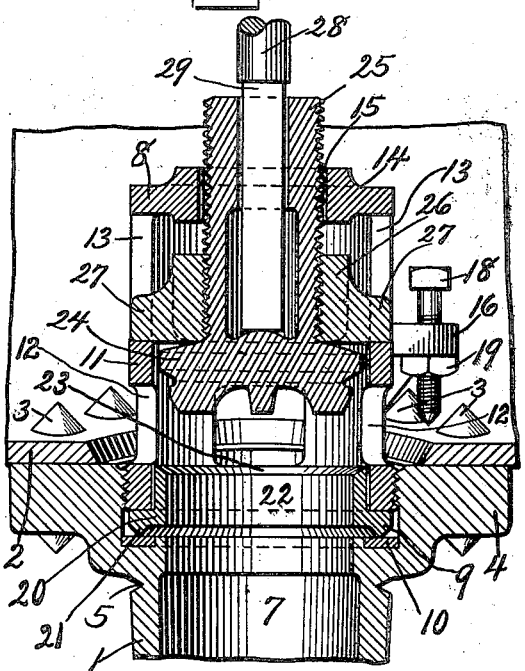
INVENTOR:
Victor R. Willoughby
BY
ATTORNEY.

April 6, 1926.
V. R. WILLOUGHBY
DISCHARGE OUTLET VALVE
Filed April 21, 1922  3 Sheets-Sheet 3
1,579,267
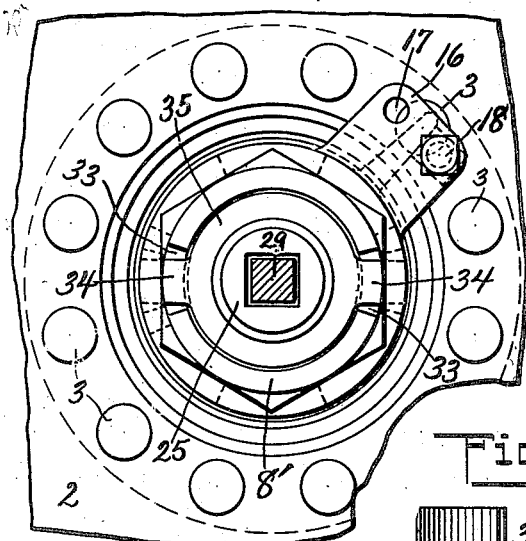
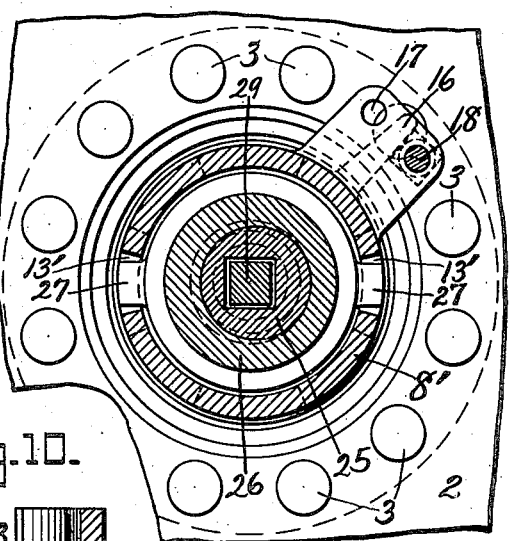
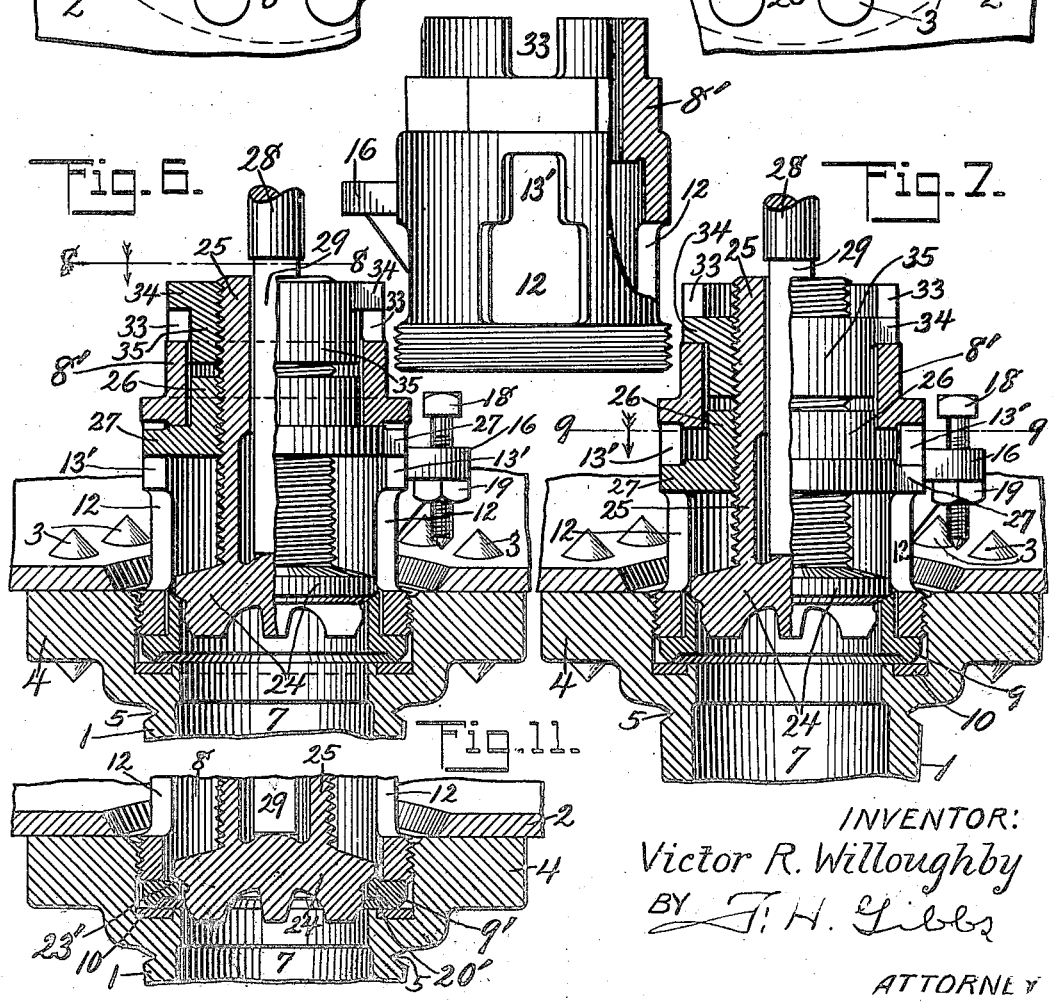
INVENTOR:
Victor R. Willoughby
BY T. H. Gibbs
ATTORNEY Patented Apr. 6, 1926.

1,579,267

UNITED STATES PATENT OFFICE.

VICTOR R. WILLOUGHBY, OF RIDGEWOOD, NEW JERSEY, ASSIGNOR TO AMERICAN CAR AND FOUNDRY COMPANY, OF NEW YORK, N. Y., A CORPORATION OF NEW JERSEY.

DISCHARGE-OUTLET VALVE.

Application filed April 21, 1922. Serial No. 555,871.

*To all whom it may concern:*

Be it known that I, VICTOR R. WILLOUGHBY, residing at Ridgewood, Bergen County, State of New Jersey, and being a citizen of the United States, have invented certain new and useful Improvements in a Discharge-Outlet Valve, of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof within the scope of the claims will occur to persons skilled in the art.

In said drawings:

Fig. 2 is a section taken on the line 2—2 of Fig. 1;

Fig. 3 is a section taken on the line 3—3 of Fig. 1;

Fig. 4 is a central vertical section of my discharge valve showing the valve in engagement with its seat;

Fig. 5 is a central vertical section of my discharge valve showing the valve in the open position;

Fig. 6 is a view, partly in section and partly in elevation, of a modified form of my device, showing the valve in closed position;

Fig. 7 is a view similar to Fig. 6 showing the valve in engagement with its seat;

Fig. 8 is a section taken on the line 8—8 of Fig. 6;

Fig. 9 is a section taken on the line 9—9 of Fig. 7;

Fig. 10 is a view, partly in elevation and partly in section, of the valve cage shown in Figs. 6 and 7; and Fig. 11 is a fragmentary sectional view showing a further modification of my device.

Figure 1:
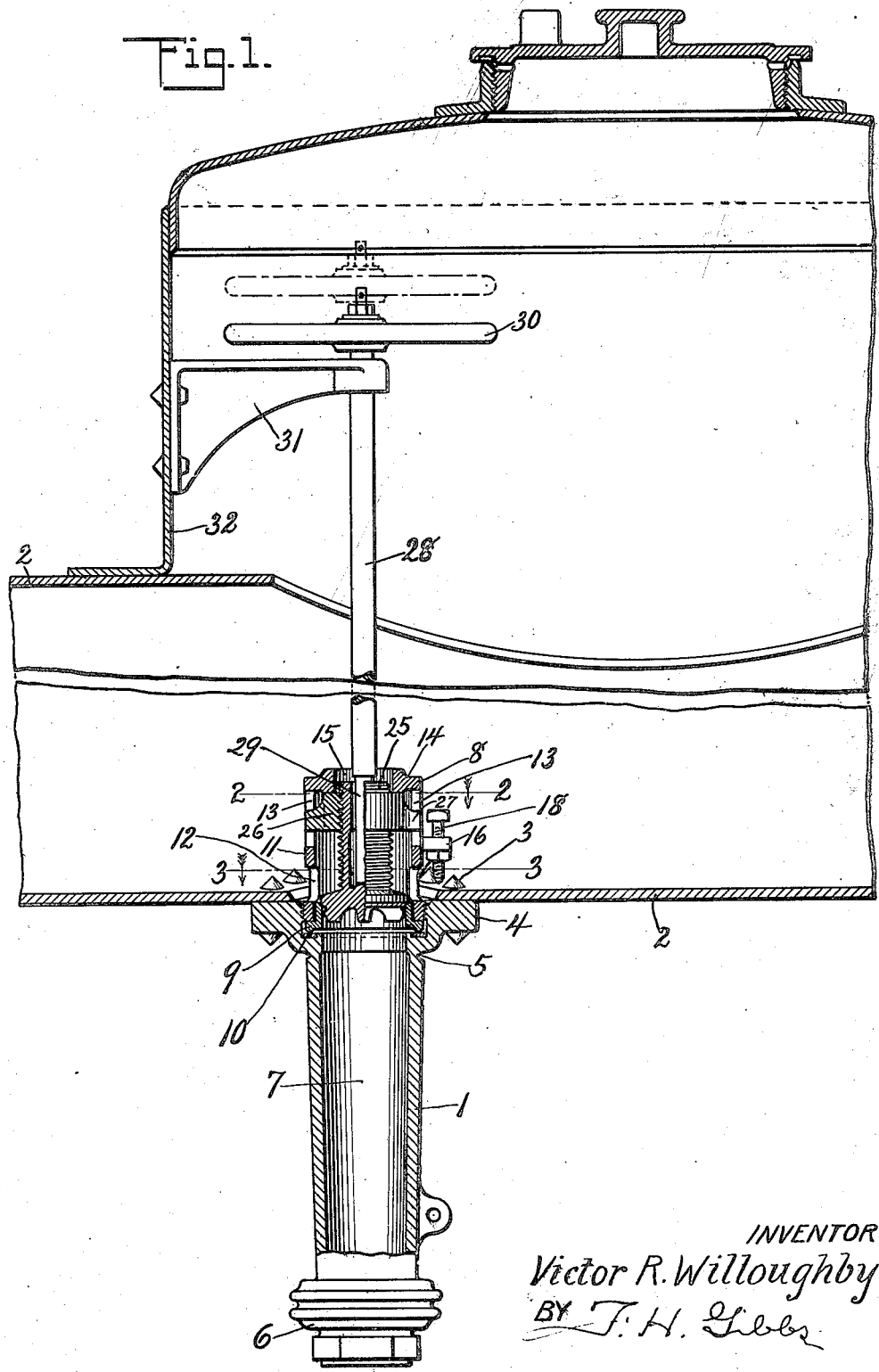
Fig. 1 is a broken central vertical section of a car tank showing my improved discharge valve, part of the discharge outlet casing being shown in elevation and the valve being shown in closed position.

It is the object of my invention to provide an improved discharge valve for tanks of such construction that the valve will grind itself to its seat so as to maintain the proper engagement of the valve with its seat. It is also an object of my invention to provide a valve of the type described in which the valve may be forced to its seat and held in engagement with its seat until the valve operating means is operated to open the valve. It is also an object of my invention to provide a valve of the type described in which the valve seat may be readily replaced.

With these and other objects in view, my invention comprises a discharge outlet casing 1 secured to the tank sheet 2 by rivets 3 passing through a flange 4 of the casing 1. The casing 1 is provided with the usual breaking groove 5 and outlet cap 6 and has its discharge opening 7 enlarged at the tank end and threaded to receive a valve cage 8 which, when screwed into the opening, serves to keep a valve seat member 9 in engagement with a packing 10 set in a groove in the casing 1. The valve cage 8 comprises a cylindrical portion 11 threaded at one end to engage in the opening 7 and provided with a plurality of openings 12 for the discharge of the tank contents and diametrically disposed openings 13. Formed integral with the cylindrical portion 11 is an end 14 provided with an opening 15 and an outwardly projecting bracket or arm 16 having threaded openings 17 in one of which is mounted a set screw 18 which is retained in position by a lock nut 19 and adapted to engage with a rivet 3 to keep the cage 8 from being unscrewed from the casing 1.

The valve seat member 9 comprises an annular body portion 20 having a tapering projection 21 which engages with the packing 10 and a projecting flange 22 formed with an inclined valve seat 23 at its outer end. The valve seat 23 is adapted to be engaged by a valve 24 having a threaded tubular stem 25 on which is mounted a collar 26 having diametrically disposed arms 27 adapted to travel in the openings 13. The valve 24 is operated by a valve operating rod 28 which has an angular end 29 adapted to engage with a similarly shaped opening in the valve stem 25. The valve rod 28 is provided with the usual hand wheel 30 and is journaled in a bracket 31 attached to the dome sheet 32.

In assembling my valve device, the collar 26 is inserted in the open end of the valve cage 8 with one of the arms 27 directed towards the corresponding opening 13. The collar 26 is then moved towards the closed end of the cage 8 with an arm 27 projecting through an opening 13 and then turned to bring the other arm 27 into the other opening 13. The valve stem 25 is then inserted in the collar 26, the valve seat member 9 placed in the discharge opening 7 and the valve cage 8 screwed into the casing 1.

In the modification of my device shown in Figs. 6 to 10, the valve cage 8' which is threaded into the discharge outlet casing 1 and holds the valve seat member 9 in engagement with the packing 10 is provided with slots 13' which are formed as reduced extensions of diametrically disposed discharge openings 12. The slots 13' are engaged by the arms 27 of the collar 26 mounted on the threaded valve stem 25 of the valve 24. The cage 8' also differs from the cage 8 in being open at its upper end and in having its upper end provided with diametrically disposed slots 33 adapted to receive arms 34 of a collar 35 mounted on the threaded stem 25.

In assembling the device shown in Figs. 6 to 10, the collar 26 is inserted in the slots 13' of cage 8' in the same manner as the collar 26 of Figs. 1 to 5 is inserted in the slots 13 of cage 8. The stem 25 is thereupon screwed into the collar 26 until the stem 25 projects a short distance beyond the collar 26. The stem 25 is thereupon screwed into the collar 35, the collar 35 being placed so that its arms 34 will engage in the slots 33.

In the modification shown in Fig. 11, the valve seat member 9' differs from the valve seat member 9 in that the valve seat 23' is formed on the annular portion 20'.

In the operation of the device shown in Figs. 1 to 5, operation of the valve operating rod 28 will cause the valve 24 to rotate on the seat 23, thus grinding itself to its seat, and cause the collar 26 to travel along the stem 25 until the arms 27 engage against the bottom of the slots 13 whereupon continued rotation of the valve operating rod 28 will cause the valve 24 to be raised from its seat 23 opening the discharge passage 7. With the valve 24 in its open position, operating the valve operating rod 28 in the opposite direction will cause the valve stem 25 to move in the collar 26 until the valve 24 engages with its seat 23 whereupon the valve 24 will rotate upon its seat 23 and the collar 26 will travel on the stem 25 until the collar 26 engages with the end 14 of the cage 8. The engagement of the collar 26 with the end 14 will cause the valve 25 to be forced to its seat 23 and will prevent the opening of the valve 24 until the rod 28 is operated in the proper manner.

In the operation of the modified structure shown in Figs. 6 to 10, operation of the valve operating rod 28 in one direction will rotate the valve 24 on its seat 23 and will cause the collars 26 and 35 to travel along the stem 25 until the arms 34 on the collar 35 engage the bottom of the slots 33 whereupon the valve 24 will be raised from its seat and the discharge passage 7 opened. With the valve 24 in its open position, operation of the valve operating rod 28 in the opposite direction will cause the valve stem 25 to travel in the collars 26 and 35 until the valve 24 engages its seat 23 whereupon the valve 24 will rotate upon its seat 23 and the collars 26 and 35 will travel along the stem 25 until the arms 27 of the collar 26 engage the upper ends of the slots 13'. The engagement of the arms 27 with the ends of the slots 13' will cause the valve 24 to be forced to its seat 23 and will prevent the opening of the valve 24 until the rod 28 is operated in the proper manner.

What I claim is:

1. In a tank discharge valve, a discharge outlet casing, a valve seat member, a valve cage adapted to secure said member in said casing, a valve in said cage adapted to engage said member and means on said valve movably mounted in said cage and engaging said cage to operate said valve.

2. In a tank discharge valve, a discharge outlet casing, a valve seat member, a valve cage adapted to secure said member in said casing, a valve in said cage and means on said valve movably mounted in said cage and adapted to cause reciprocation of said valve to and from said member by engagement with said cage.

3. In a tank discharge valve, a discharge outlet casing, a valve seat member, a valve cage adapted to secure said member in said casing, a valve in said cage and means on said valve adapted to be engaged with said cage to force said valve to its seat on said member by rotating said valve.

4. In a tank discharge valve, a discharge outlet casing, a valve seat member, a valve cage adapted to secure said member in said casing, a valve in said cage and means on said valve adapted to be engaged with said cage to raise said valve from its seat on said member by rotating said valve.

5. In a tank discharge valve, a discharge outlet casing, a valve seat member seated in said casing, a slotted valve cage adapted to secure said member in said casing, a valve in said cage, means to rotate said valve and a collar on said valve having arms engaging in the slots in said cage to operate said valve to and from its seat on said member upon rotation of said valve.

6. In a tank discharge valve, a slotted valve cage, a rotatable valve in said cage, operating means loosely engaging said valve and a collar on said valve having arms engaging in the slots in said cage to cause longitudinal movement of said valve upon rotation of said valve.

7. In a tank discharge valve, a discharge outlet casing, a valve seat member seated in said casing, a slotted valve cage adapted to secure said member in said casing, a valve in said cage, means to rotate said valve, means on said valve having arms travelling in the slots in said cage, said means being adapted to operate said valve to and from its seat on said member, upon rotation of said valve and means to lock said cage in position.

8. In a tank discharge valve, a slotted valve cage, a rotatable valve in said cage, means to rotate said valve and a collar on said valve having arms guided in the slots in said cage, said collar being operated upon the rotation of said valve to engage with said cage and shift said valve with respect to said cage.

9. In a tank discharge valve, a slotted valve cage, a rotatable valve in said cage, means to rotate said valve and means on said valve having projections engaging in said slots, said means being moved to engage with said cage to operate said valve upon rotation of said valve.

10. In a tank discharge valve, a slotted valve cage, a rotatable valve in said cage, operating means loosely engaging said valve and means on said valve having projections adapted to travel in said slots, said means being adapted to cause reciprocation of said valve by engagement with said cage upon rotation of said valve.

11. In a tank discharge valve, a discharge outlet casing connected to the tank, a valve seat member seated in said outlet casing and a valve cage carried by said outlet casing and securing said valve seat member in said outlet casing, and means locking said valve cage in position.

In witness whereof I have hereunto set my hand.

VICTOR R. WILLOUGHBY.